United States Patent
Tee et al.

(10) Patent No.: US 7,496,703 B2
(45) Date of Patent: *Feb. 24, 2009

(54) VIRTUAL IDE CARD READER WITH PCI EXPRESS INTERFACE

(75) Inventors: Boon-Kuew Tee, Taipei (TW); Wee-Kuan Gan, Taipei (TW)

(73) Assignee: Phison Electronics Corp., Miaoli (TW)

( * ) Notice: Subject to any disclaimer, the term of this patent is extended or adjusted under 35 U.S.C. 154(b) by 359 days.

This patent is subject to a terminal disclaimer.

(21) Appl. No.: 10/906,936

(22) Filed: Mar. 14, 2005

(65) Prior Publication Data

US 2006/0206639 A1   Sep. 14, 2006

(51) Int. Cl.
G06F 13/12 (2006.01)
G06F 13/36 (2006.01)
G06F 13/20 (2006.01)
G06F 12/00 (2006.01)

(52) U.S. Cl. .................. 710/74; 710/315; 710/313; 711/115

(58) Field of Classification Search .............. 710/74
See application file for complete search history.

(56) References Cited

U.S. PATENT DOCUMENTS 6,292,863 B1 * 9/2001 Terasaki et al. ............ 710/313
7,222,211 B2 * 5/2007 Lee et al. ................... 710/315
7,222,212 B2 * 5/2007 Lee et al. ................... 710/315
7,225,289 B2 * 5/2007 Tee et al. ................... 710/315
7,356,637 B2 * 4/2008 Tee et al. ................... 710/315
7,376,781 B2 * 5/2008 Lee et al. ................... 710/315
2003/0084221 A1 * 5/2003 Jones et al. ................. 710/302
2005/0097263 A1 * 5/2005 Wurzburg ................... 711/103
2005/0120146 A1 * 6/2005 Chen et al. .................. 710/22

* cited by examiner

Primary Examiner—Niketa I Patel
Assistant Examiner—Juanito C Borromeo
(74) Attorney, Agent, or Firm—Jianq Chyun IP Office

(57) ABSTRACT

The present invention discloses a virtual integrated drive electronics (IDE) card reader with a peripheral component interconnect express (PCI Express). The card reader includes a microcontroller connected to a PCI Express connecting interface and a memory card connecting interface separately. The microcontroller includes a memory card interface, a PCI Express interface, and a virtual IDE module. The virtual IDE module includes a IDE host and a IDE device. If the host sends an instruction for storing or reading data to a memory card connected to the card reader, the instruction will be sent to and executed in the virtual IDE module. The data in the memory card can be transmitted at a transmission rate up to the standard of an IDE device, and the host will consider the card reader as an IDE device instead of a PCI Express device only.

17 Claims, 2 Drawing Sheets

VIRTUAL IDE CARD READER WITH PCI EXPRESS INTERFACE

BACKGROUND OF THE INVENTION

1. Field of the Invention

The present invention relates to a virtual integrated drive electronics (IDE) card reader with a peripheral component interconnect express (PCI Express) interface, and more particularly to a virtual IDE card reader that uses the PCI Express interface as a transmission interface.

2. Description of the Related Art

As the science and technology of computers grows in a fast changing manner, a computer tends to be developed with powerful computational functions and a fast speed, and thus the clock of a central processing unit (CPU) is too fast, and the transmission rate of other peripheral equipments cannot catch up with the processing speed of the CPU at all. Even though the CPU continues enhancing its performance, the transmission rate of peripheral equipments cannot be improved much because the overall performance of a computer depends on the whole system. It is necessary to improve the whole computer architecture before the performance of a CPU can be maximized.

However, the data transmission rate depends on the transmission rate of a bus. To enhance the performance of a computer, related manufacturers usually improve the transmission rate of a bus. For example, the transmission rate of an integrated drive electronic (IDE) interface connected to a hard disk drive reaches 160 MB/s; the network line is upgraded from 10 MB/s to 1 GB/s; the transmission rate of the RS-232 is replaced by the 480 MB/s of the universal serial bus (USB), and the present PCI with a transmission rate of 133 MB/s upgrades the transmission rate of its lane to 250 MB/s which is know as a new-generation generation peripheral component interconnect express (PCI Express). The PCI Express further supports a hot-plug control function. Therefore, the PCI Express is extensively accepted by users.

Further, The flash memory since its announcement gradually replaces the EEPROM or battery power memory in many portable device due to its charming features including low power consumption, non-volatility, shock resistance, and high-capacity storage. With the advanced semiconductor technologies, the storage capacity and transmission rate of a flash memory grow rapidly. The flash memory replaces traditional storage medium such as a hard disk drive in many applications; however, the present memory card made of flash memories has become an indispensable product to the general public and the sales volume and types of memory cards are growing due to the popularity of electric products such as digital cameras, PDAs and mobile phones.

Most memory cards use a universal serial bus (USB) interface or an integrated drive electronics (IDE) interface as the transmission interface. The transmission rates of the USB or IDE interface are just 480 MB/s and 160 MB/s respectively, and such transmission rates cannot catch up with the accessing speed of the memory card. Therefore, the applications of memories are restricted by the USB or IDE interface of the host, and its performance cannot be maximized.

Further, several environment interfaces that integrate editing, coding, debugging, file management and execution are provided in a program development system or a software program, and such environment interface enables a programmer to execute and develop most of the work required for an application program. Therefore, the software executed at the host adopts a specific environment interface and peripheral devices for communications, and the peripheral devices mush have the environment interface of the host before the instruction from the host can be executed.

Therefore, using a bus with a faster transmission rate as a transmission interface to maximize the performance of a memory card is an important subject for manufacturers in the related field to make further improvements.

Therefore, it is desirable to provide a card reader that eliminates the aforesaid drawbacks.

SUMMARY OF THE INVENTION

The present invention has been accomplished under the circumstances in view. Therefore, it is a primary objective of the present invention to use the PCI Express bus as a transmission interface between a host and a card reader, and the card reader has a virtual IDE module capable of communicating with the host, such that the card reader can achieve the best transmission rate when accessing data in a memory card through the card reader, and the card reader also has the features of an IDE interface.

To achieve the foregoing objective, the card reader comprises a microcontroller, and the microcontroller is connected separately to a PCI Express bus built in a host and memory card connecting interface for connecting a memory card, and the microcontroller has a memory card interface, a PCI Express, and a virtual IDE module, such that if the host gives an instruction to a memory card connected to a card reader for storing or reading data, the instruction will be sent to the virtual IDE module and the execution of the instruction will be completed by the virtual IDE module. The data in the memory card connected to the card reader follows the instruction, and the memory card interface and the PCI Express interface built in the microcontroller converts the data into a data format acceptable to the memory card or the PCI Express bus. The data is ten sent to the host or the memory card, such that the host can give instruction to the card reader through the virtual IDE module for accessing data, and the data transmission rate can meet the transmission rate of the PCI Express standard without losing the feature of n IDE interface.

DETAILED DESCRIPTION OF THE PREFERRED EMBODIMENT

Figure 1:
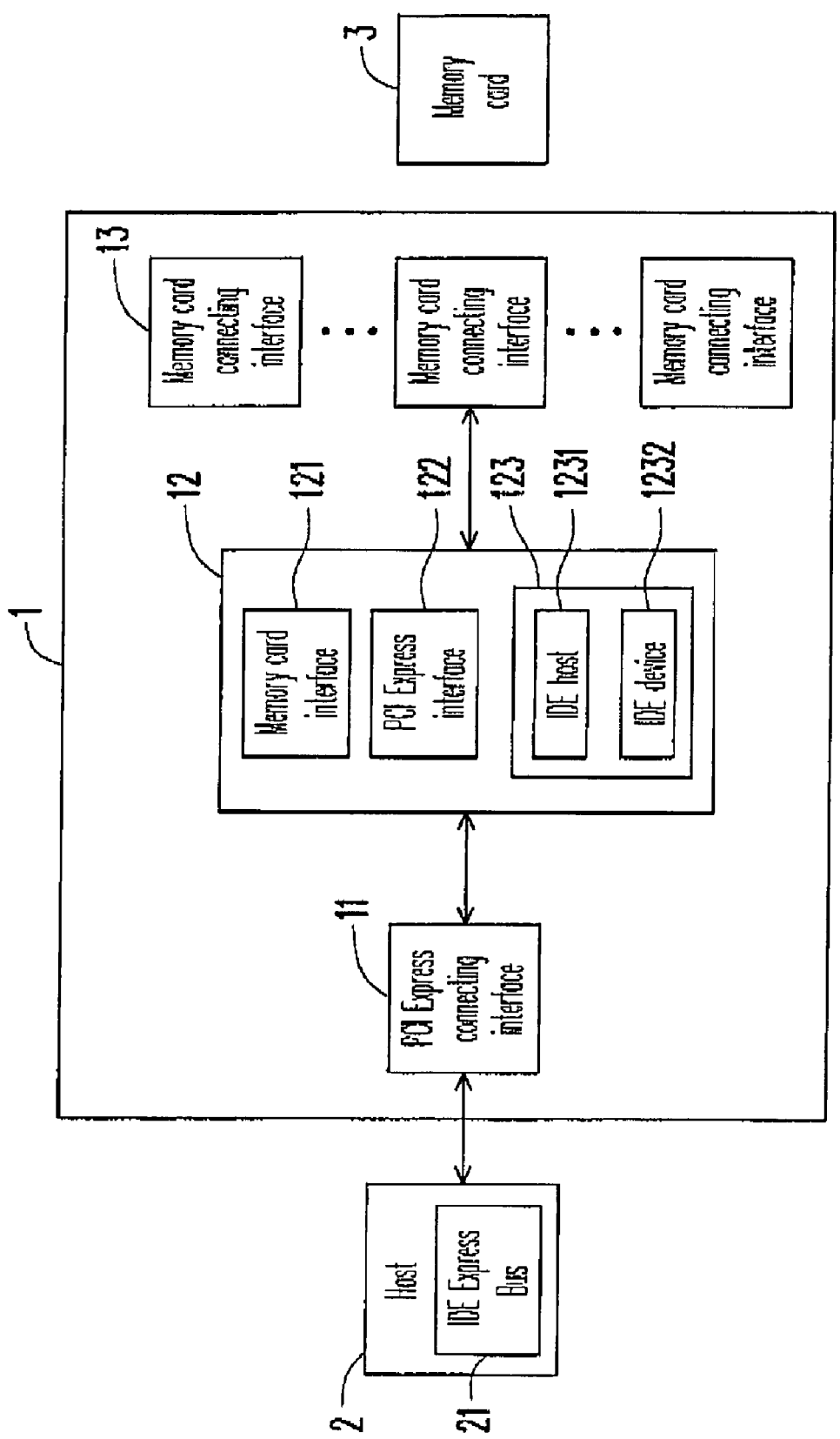
FIG. 1 is a block diagram according to a preferred embodiment of the present invention.

In FIG. 1, a card reader 1 of the present invention includes a PCI Express connecting interface 11, a microcontroller 12, and at least one memory card connecting interface 13. According to an aspect of the embodiment the at, least one memory card connecting interface 13 includes a plurality of memory card connecting interfaces.

The PCI Express connecting interface 11 is provided for connecting to a PCI Express bus 21 built in a host 2.

The microcontroller 12 includes a memory card interface 121, a PCI Express interface 122, and a virtual IDE module 123, and the virtual IDE module 123 includes an IDE host 1231 and IDE device 1232, and the microcontroller 12 is connected to the PCI Express connecting interface 11, and the virtual IDE module 123 is not physical, but it is virtual and simulated by a designer's firmware program.

The memory card connecting interface 13 is connected to the microcontroller 12, and the memory card connecting interface 13 is provided for connecting a memory card 3.

If the PCI Express connecting interface 11 built in the card reader 1 is connected to the PCI Express bus 21 built in the host 2, the microcontroller 12 of the card reader 1 will declare to the host 2 that the memory card 1 is an IDE host, such that the host 2 will consider the microcontroller 12 as an IDE host, even though the host 2 remains communicating with the microcontroller 12 by the PCI Express architecture. Simultaneously, when the memory card 3 is connected to the memory card connecting interface 13, and the host 2 gives an instruction to the memory card 3 for storing data, the instruction will be sent to the IDE host 1231 installed in the virtual IDE module 123 of the microcontroller 2 first, and then the IDE host 1231 will send the instruction to the IDE device 1232, and the IDE device 1232 will complete the execution of the instruction. At that time, the data of host 2 will be sent to the microcontroller 12 through the PCI Express bus 21 and the PCI Express connecting interface 11, and the memory card interface 121 built in the microcontroller 12 will convert the data into a data format acceptable to the memory card 3, and the data is stored in the memory card 3.

Further, if the host 2 wants to read a data stored in the memory card 3, the IDE instruction will be sent to the IDE host 1231 built in the virtual IDE module 123 of the microcontroller 12 first, and then the IDE host 1231 will send the instruction to an IDE device 1232, and the IDE device 1232 will complete the execution of the instruction. At that time, the memory card 3 will send the data to the microcontroller 12, and the PCI Express interface 122 built in the microcontroller 12 will convert the data into a data format acceptable to the PCI Express bus 21, and then the data is sent to the host 2 through the PCI Express connecting interface 11 and the PCI Express bus 21.

From the description above, when the host 2 reads or stores data of a memory card 3 connected to the card reader 1, the data is read from or written into the memory card 3 through the microcontroller 12, and the read or write instruction is executed and completed by the IDE host 1231 and the IDE device 1232 built in the virtual IDE module 123. Therefore, the host 2 considers the card reader 1 as an IDE card reader with a PCI Express interface.

Further, the IDE instruction could be incompliance with an advanced technology attachment (ATA) specification or a Serial ATA specification, and these specifications are used for the purpose of describing an embodiment of the IDE instruction and not intended to limit the scope of the present invention. The memory card interface 121 could be a compact flash (CF) memory card interface, a memory stick (MS) memory card interface, an extreme digital (XD) memory card interface, a smart media memory card interface, a multi-media card (MMC) memory card interface or a secure digital (SD) card interface. The memory card 3 includes a flash memory device, such as a compact flash (CF) memory, an extreme digital (XD), a memory multi-media card (MMC) memory, or a secure digital (SD) memory.

Further, the quantity of memory card connecting interface 13 could be one or more.

Figure 2:
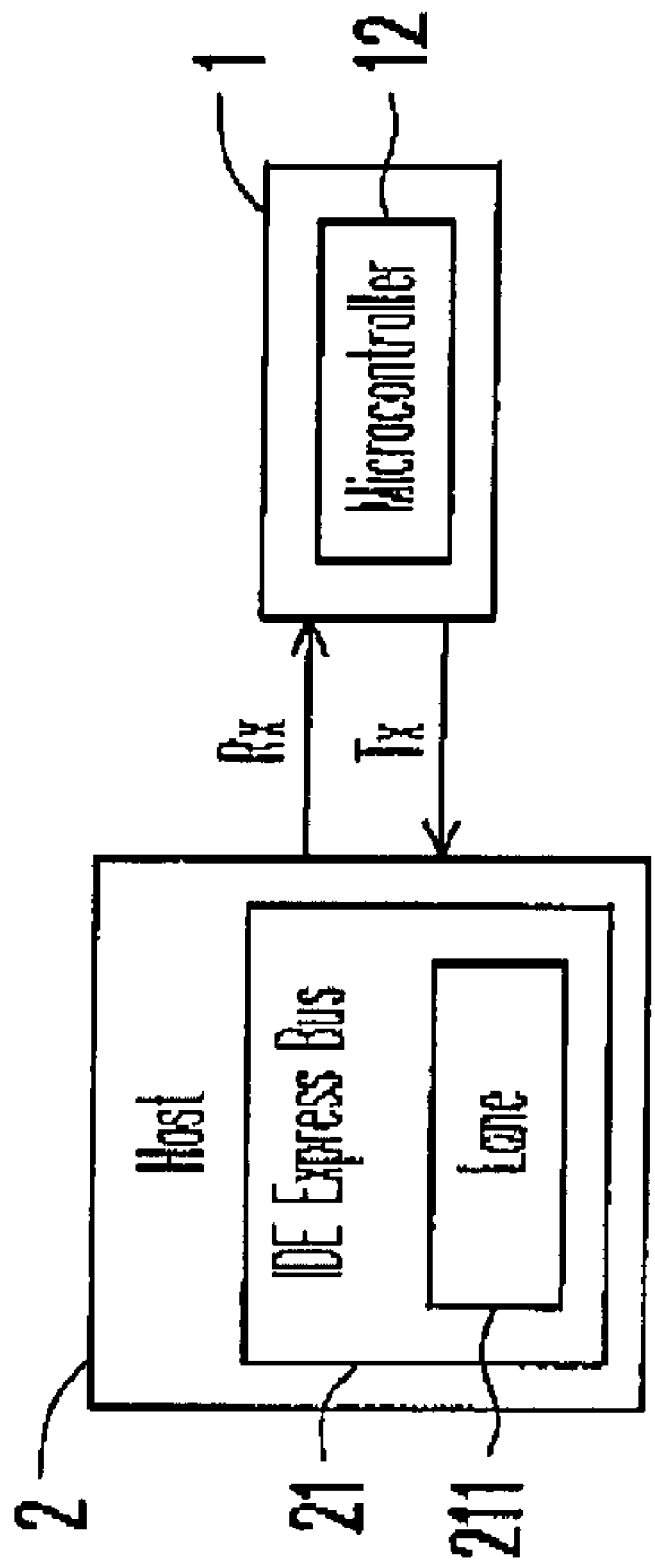
FIG. 2 is a schematic diagram of a data transmission according to a preferred embodiment of the present invention.

In FIG. 2, the host 2 and the card read 1 has at least one lane 211 at a physical layer for transmitting data, and the lane 211 includes a transmitting end ($T_x$) and a receiving end ($R_x$). According to an aspect of the embodiment, the at least one lane 211 includes a plurality of lanes.

Therefore, the key for the virtual IDE card reader with PCI Express connecting interface in accordance with the present invention to improve the prior arts resides on that the present invention uses an IDE host and an IDE device built in the card reader to execute the instruction given by the host and also uses a PCI Express interface as the transmission interface between the host and the card reader, such that the data can be transmitted at a transmission rate that can meet the PCI Express standard, and the card reader can achieve the best transmission rate.

A prototype of virtual IDE card reader with PCI Express connecting interface has been construed with the features of FIGS. 1~2. The virtual IDE card reader with PCI Express interface functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A virtual integrated drive electronics (IDE) card reader with a peripheral component interconnect express (PCI Express) connecting interface, comprising:

a microcontroller, having a memory card interface and a PCI Express interface capable of converting a data into a memory card format or a PCI Express format, and a virtual IDE module capable of receiving an instruction given by a host, and said virtual IDE module having an IDE host for receiving an IDE instruction given by said host and an IDE device for completing execution of said IDE instruction;

at least one memory card connecting interface, coupled to said microcontroller and provided for connecting a memory card;

the PCI Express connecting interface, configured for connecting to a PCI Express bus disposed in said host, and provided for coupling said microcontroller to said host, such that if said host stores or reads a data of said memory card coupled to said memory card connecting interface, said microcontroller of said card reader declares to said host that said card reader is an IDE host, and said IDE instruction given by said host is sent to said virtual IDE module and execution of said instruction is completed by said virtual IDE module, and said data in said memory card coupled to said memory card interface and said PCI Express interface of said microcontroller into a data format acceptable by said memory card or said PCI Express bus, and then said data is sent to said host or stored in said memory card.

2. The virtual IDE card reader as claimed in claim 1, wherein said host and said card reader have at least one lane at a physical layer for transmitting data, and said lane comprises a transmitting end ($T_x$) and a receiving end ($R_x$).

3. The virtual IDE card reader as claimed in claim 2, wherein said at least one lane comprises a plurality of lanes.

4. The virtual IDE card reader as claimed in claim 1, wherein said at least one memory card connecting interface includes a plurality of memory card connecting interfaces.

5. The virtual IDE card reader as claimed in claim 1, wherein said memory card interface is a compact flash (CF) memory card interface.

6. The virtual IDE card reader as claimed in claim 1, wherein said memory card interface is a memory stick (MS) memory card interface.

7. The virtual IDE card reader as claimed in claim 1, wherein said memory card interface is an extreme digital (XD) memory card interface.

8. The virtual IDE card reader as claimed in claim 1, wherein said memory card interface is a secure digital (SD) memory card interface.

9. The virtual IDE card reader as claimed in claim 1, wherein said memory card interface is a smart media memory card interface.

10. The virtual IDE card reader as claimed in claim 1, wherein said memory card interface is a multi-media card (MMC) memory card interface.

11. The virtual IDE card reader as claimed in claim 1, wherein said IDE instruction is in compliance with an advanced technology attachment (ATA) specification.

12. The virtual IDE card reader as claimed in claim 1, wherein said IDE instruction is in compliance with a Serial advanced technology attachment ATA) specification.

13. A card reader with a peripheral component interconnect express (PCI Express) connecting interface, the card reader comprising:
   a microcontroller having a flash memory interface, a PCI Express interface, and a virtual integrated drive electronics (IDE) module capable of receiving an instruction given by a host, the virtual IDE module having an IDE host for receiving an IDE instruction given by the host and an IDE device for executing the IDE instruction, the virtual IDE module being implemented by a firmware program to be executed by the microcontroller;
   at least one flash memory card connecting interface, coupled to said microcontroller and provided for connecting a card reader to a flash memory card; and
   a PCI Express connecting interface capable of being connected to a PCI Express bus disposed between the host and the card reader, and being provided for coupling the microcontroller to the host,
   wherein when the card reader is connected to the host, the microcontroller declares the host that the card reader is an IDE host, and
   wherein when the host reads data stored in a flash memory of the flash memory card, the IDE instruction given by the host is sent to the virtual IDE module to be executed by the virtual IDE module, and the data in the flash memory is converted by the flash memory card connecting interface or the PCI Express interface of the microcontroller into a data format acceptable by the PCI Express bus, and then the converted data is sent to the host.

14. The flash storage device as claimed in claim 13, wherein the IDE instruction complies with an advanced technology attachment (ATA) specification.

15. The flash storage device as claimed in claim 13, wherein the IDE instruction complies with a Serial advanced technology attachment (ATA) specification.

16. The flash storage device as claimed in claim 1, wherein the host and the card reader have only one lane at a physical layer for transmitting data, and the lane comprises a transmitting end (Tx) and a receiving end (Rx).

17. The flash storage device as claimed in claim 13, wherein the host and the card reader have more than one lane at a physical layer for transmitting data, and the lanes comprise a transmitting end (Tx) and a receiving end (Rx).

* * * * *